United States Patent [19]

deMey, II

[11] 4,199,132
[45] Apr. 22, 1980

[54] HIGH-PRESSURE REMOTE-CONTROLLED VALVE

[75] Inventor: Charles F. deMey, II, West Redding, Conn.

[73] Assignee: The Perkin-Elmer Corporation, Norwalk, Conn.

[21] Appl. No.: 934,643

[22] Filed: Aug. 17, 1978

[51] Int. Cl.² .............................................. F16K 31/04
[52] U.S. Cl. .................................... 251/134; 251/282; 251/368
[58] Field of Search ......................... 251/282, 134, 368

[56] References Cited

U.S. PATENT DOCUMENTS

| | | | |
|---|---|---|---|
| 2,934,090 | 4/1960 | Kenann et al. | 251/282 X |
| 2,989,758 | 6/1961 | Turek et al. | 251/134 X |
| 3,534,770 | 10/1970 | Kowalski | 251/282 X |
| 3,756,558 | 9/1973 | Okui | 251/282 |
| 3,780,984 | 12/1973 | Ambrose et al. | 251/282 |
| 3,985,333 | 10/1976 | Paulsen | 251/282 X |

*Primary Examiner*—Arnold Rosenthal
*Attorney, Agent, or Firm*—S. A. Giarratana; F. L. Masselle; E. T. Grimes

[57] ABSTRACT

A valve having a plunger with opposite end sections of equal diameter, a control section of lesser diameter and a valve member. One end section extends from the inlet chamber through a seal to the exterior of the valve, and the other end section extends from the outlet chamber through a seal to the exterior of the valve. The inlet and outlet chambers are connected by a central bore having a diameter equal to that of the plunger end sections. The central section of the plunger extends through the central bore. The valve member seats against one end of the central bore to close the valve. Because of the equal diameters of the axial bores of the end sections and the central bore, the force exerted on the plunger by fluid pressure in the valve are balanced regardless of the plunger position, i.e., open, closed, or at any intermediate position. The valve is controlled by a motor-driven eccentric, which acts against one end section of the plunger to counteract a small closing force exerted by a spring against the other end section of the plunger. Limit switches are actuated by the eccentric to de-energize its motor after it has caused the eccentric to open or close the valve.

12 Claims, 2 Drawing Figures

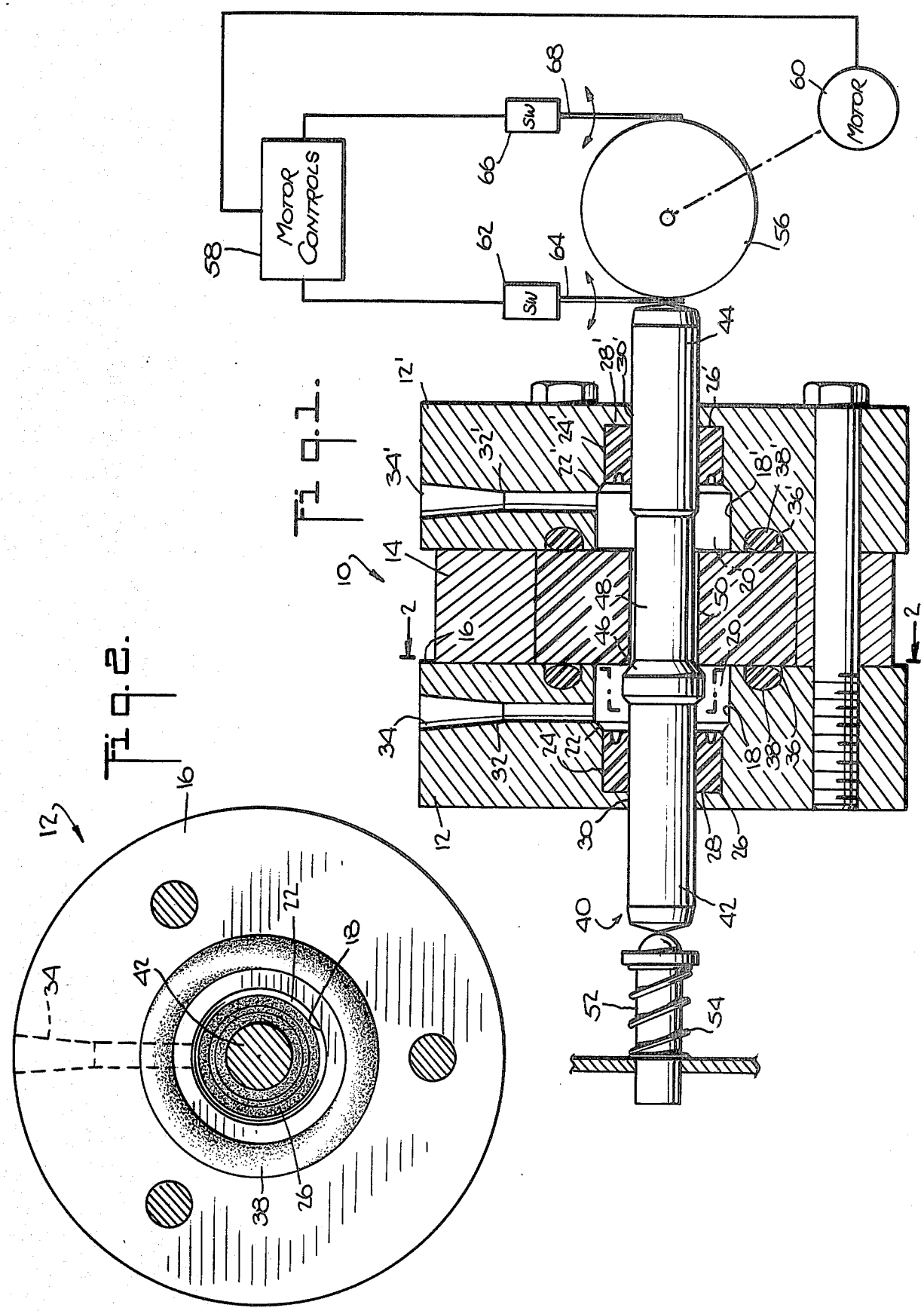

HIGH-PRESSURE REMOTE-CONTROLLED VALVE

BACKGROUND OF THE INVENTION

Several problems exist in known valves for remotely controlling fluid flow over a widely-variable range of fluid pressures. Most known valves are constructed so as to puch a cone-shaped plunger end into a hole formed by a valve seat in order to stop fluid flow. If the pressure of the fluid is, for example, 8000 psi, then a relatively high force must be applied to the cone-shaped plunger end by the remote-controlling apparatus in order to close the valve and thereby stop fluid flow. However, when the fluid pressure drops to a low valve, for example 10 psi, the remote-controlling apparatus will still apply the same relatively high force required to close the valve at the upper end of the range of liquid pressures encountered. Thus, the force required to hold off 7990 psi is applied to the cone-shaped plunger and to the valve seat, with the usual result that one or both of these valve components becomes deformed, thereby rendering the valve inoperative.

Another problem in known valves is that the internal volume of the valve varies as the position of the plunger varies. This is an undersirable variable in any system for effecting either a precise flow rate or a precise control of fluid volume passed.

A third problem in known valves is that the internal volume of the valve is so large that it causes mixing of different fluids that are passed through the valve one after the other.

SUMMARY OF THE INVENTION

The present invention is embodied in and carried out by a high-pressure remote-controlled valve having a plunger on which fluid forces are always balanced, independent of fluid pressure or plunger position. The internal volume of the valve is small, and is constant regardless of plunger position. A small, predetermined closing force is exerted on one end of the plunger, and may be overcome by control apparatus acting on the other end of the plunger to open the valve.

BRIEF DESCRIPTION OF THE DRAWINGS

The present invention will be better understood by reading the written description thereof with reference to the accompanying drawings, of which:

FIG. 1 is a partially-sectional side view of the high-pressure remote controlled valve embodying the present invention; and FIG. 2 is a sectional view taken along line 2—2 of the valve per se in FIG. 1.

DETAILED DESCRIPTION OF THE PREFERRED EMBODIMENT

Referring to FIG. 1, the high-pressure remote-controlled valve shown there consists essentially of the valve 10 and the mechanism for controlling the valve. The valve body is formed by two identical end plates 12 and 12' which are preferably made of anti-corrosive #316 stainless steel, and a center member 14 which preferably comprises a radially inner ring made of TEFZEL fluoroplastic having a minimum cold flow characteristic and a radially outer ring of stainless steel to prevent it from deforming under pressure. The center member 14 is sandwiched between the end plates 12, 12' and these three components are secured to one another by three equally-spaced bolts, each extending through threaded bores in each of the end plates 12, 12' and in the center member 14. Because the end plates 12, 12' can be identical, only end plate 12 will be described in detail, it being understood that this description applies as well to the corresponding primed reference numbers of end plate 12'. From the inner face 16, a series of axial bores extend through the end plate 12. The first is the largest bore 18, which defines a chamber 20. A chamferred region 22 connects bore 18 to intermediate bore 24 for leading in a TEFLON-filed seal 26. This seal fits in the intermediate bore 24 and is seated against the shoulder 28 formed between the intermediate bore 24 and a small bore 30. A radial passage 32 extends from the large bore 18 to an outlet port 34 at the periphery of the end plate 12. An annular recess 36 is formed in the inner face 16 around the entrance to the large bore to receive an O-ring seal 38, which is pressed against the center member 14.

A plunger 40 having opposite end sections 42, 44 of equal diameter, a valve nmember 46, and a central section 48 of lesser diameter than the end sections 42, 44 extends through the axial bores of the end plates and the axial bore 50 of the central member 14, the diameter of which is equal to that of the end section 42, 44 of the plunger 40. In operation, when the valve is closed, as shown in FIG. 1, the fluid, enters through the inlet port 34' and flows through the radial passage 32' to the chamber 20'. Because the cross-sectional area of the axial bore of the central member 14 is equal to the cross-sectional area of the axial bore of the end plate 12', the forces acting on the plunger 40 caused by the fluid pressure in the chamber 20' are equal and opposite, i.e. balanced. Now, when the valve is opened, i.e. the plunger moves to the left as viewed in FIG. 1, the the valve member 46 is unseated from the opening into the bore 50, and there is fluid flow communication from the inlet chamber 20' through the bore 50 to the outlet chamber 20. Because the cross-sectional area of the axial bore of the end plate 12 is equal to the cross-sectional area of the axial bore of the end plate 12', the forces acting on the plunger 40 caused by the fluid pressure in the chambers 20 and 20' are equal and opposite, i.e. balanced. Thus, it will be particularly appreciated that regardless of the position of the plunger, the fluid forces acting thereon are always balanced. This is particularly important in view of the fact that the fluid pressure may range in some practical applications from a low of the order of about 10 psi to a high of the order of about 8,000 psi. As a result, relatively small forces acting on the ends of the plunger are sufficient for opening and closing the valve, as will be explained more fully hereafter. Another advantage of this structure resides in the fact that the internal volume is constant regardless of the plunger position, thereby enhancing precise control of the fluid volume passed.

The control mechanism for valve 10 preferably comprises an actuator 52, which is biased by spring 54 to exert a small closing force on the tip of end section 42 of the plunger 40, combined with a motor-controlled eccentric 56, which may be rotated to exert a force on the tip of the end section 44 greater than that of the spring 54 to open the valve 10. In this manner, the force exerted by valve member 46 against the opening of bore 50 is limited to the relatively low value required to form a seal at the ring of contact, independent of the fluid pressure. Hence, there is no danger of deforming either the valve member 46 or the valve seat formed at the opening of bore 50. To open the valve 10, the motor controls 58 are employed to energize the small motor 60, which causes the eccentric 56 to rotate approximately 180°, at which point the limit switch 62 is actuated by the displacement of arm 64 to de-energize the motor. Thus, the plunger 40 is held in the open position. To close the valve 10, the motor controls 58 are again employed to energize the motor 60, which again causes the eccentric 56 to rotate approximately 180° at which point the limit switch 66 is actuated by the displacement of arm 68 to de-energize the motor. Thus, the plunger 40 is returned to the closed position by the force of the spring 54 applied to the end section 42 through the actuator 52, the counteracting force of the eccentric 56 having been removed from the opposite end section 44.

The advantages of the present invention, as well as certain changes and modifications to the disclosed embodiment thereof will be readily apparent to those skilled in the art. It is the applicant's intention to cover all those changes and modifications which could be made to the embodiment of the invention herein chosen for the purposes of the disclosure without departing from the spirit and scope of the invention.

What I claim is:

1. A high-pressure, remote-controlled valve comprising:
   a valve body enclosing an inlet chamber, a central bore, and an outlet chamber; said valve body including first and second end plates, each having large, intermediate, and small coaxial bores, a passage extending radially from its periphery to the chamber formed by said bores, and an annular recess on its inner face; a central member having said central bore formed therein and abutting said inner faces of said end plates; first and second sealing means compressed in said annular recesses by said central member; and retaining means operative to hold the inner faces of said end plates in tight abuttment with the opposite sides of said central member;
   a plunger, having first and second end sections extending from said outlet and inlet chambers, respectively, to the exterior of said valve body, a valve member positioned in one of said chambers adjacent an opening to said central bore, and a central section extending from said valve member through said central bore, said end sections having the same cross-sectional area as said central bore, and said central section having a smaller sectional area than said end sections;
   first and second sealing means surrounding said first and second end sections, respectively, within said outlet and inlet chambers, respectively; and
   control means operative, when actuated, to selectively move said valve member against or away from said opening to said central bore.

2. A high-pressure remote-controlled valve according to claim 1, wherein said chambers comprise said large bores in said end plates, said sealing means are seated in said intermediate bores, and said end sections of said plunger extend through said sealing means and through said small bores to the exterior of said valve body.

3. A high-pressure remote-controlled valve according to claim 1, wherein said passage extends radially to said large bore in each end plate.

4. A high-pressure remote-controlled valve according to claim 1, wherein each end plate is stainless steel and said central member is TEFZEL fluorplastic with a radially outer ring of stainless steel.

5. A high-pressure remote-controlled valve according to claim 1, wherein said valve member has a larger diameter than said end sections, and has a sloped surface facing said opening to said central bore.

6. A high-pressure remote-controlled valve according to claim 1, wherein said control means comprises:
   (a) a spring-biased actuator exerting a closing force on said first end section of said plunger; and
   (b) an eccentric member selectively actuatable to apply or remove an opening counterforce to said second end section of said plunger.

7. A high-pressure remote-controlled valve according to claim 6, further comprising:
   (a) a motor mechanically connected to said eccentric member;
   (b) motor control means operative when actuated to energize said motor and
   (c) first and second limit switches actuated by said eccentric member and operative to de-energize said motor after it has turned said eccentric member through a predetermined angular distance.

8. A high-pressure valve comprising:
   a valve body enclosing an inlet chamber, a central bore, and an outlet chamber;
   a plunger having first and second end sections extending from said outlet and inlet chambers, respectively, to the exterior of said valve body, a valve member positioned in one of said chambers adjacent an opening to said central bore, and a central section extending from said valve member through said central bore, said end sections having the same cross-sectional area as said central bore, and said central section having a smaller cross-sectional area than said end sections; and
   first and second sealing means surrounding said first and second end sections, respectively, within said outlet and inlet chambers, respectively;
   said valve body including first and second end plates, each having large, intermediate, and small coaxial bores, a passage extending radially from its periphery to the chamber formed by said bores, and an annular recess on its inner face;
   a central member having said central bore formed therein, and abutting said inner faces of said end plates;
   first and second sealing means compressed in said annular recesses by said central member; and
   retaining means operative to hold the inner faces of said end plates in tight abutment with the opposite sides of said central member.

9. A high-pressure valve according to claim 8, wherein said chambers comprise said large bores in said end plates, said sealing means are seated in said intermediate bores, and said end sections of said plunger extend through said sealing means and through said small bores to the exterior of said valve body.

10. A high-pressure valve according to claim 8, wherein said passage extends radially to said large bore in each end plate.

11. A high-pressure valve according to claim 8, wherein each end plate is stainless steel and said central member is TEFZEL fluorplastic with a radially outer ring of stainless steel.

12. A high-pressure valve according to claim 8, wherein said valve member has a larger diameter than said end sections, and has a sloped surface facing said opening to said central bore.

* * * * *